3,284,294
METHODS AND COMPOSITIONS FOR
TREATING SOIL
Klaus Sasse, Cologne-Stammheim, and Bernhard Homeyer, Opladen, Germany, assignors to Farbenfabriken Bayer Aktiengesellschaft, Leverkusen, Germany, a German corporation
No Drawing. Filed Apr. 26, 1965, Ser. No. 451,072
Claims priority, application Germany, Apr. 29, 1964,
F 42,750
47 Claims. (Cl. 167—33)

The present invention relates to particular soil treatment compositions as well as new methods of using certain benzoxazoles as soil disinfectants, and the like.

It is already known the benzothiazoles, especially 2-chloro-benzothiazole, have nematocidal properties and can, therefore, be used for combating nematodes (cf. German Patent No. 1,035,959).

It is an object of the present invention to provide particular soil treatment compositions which are extremely effective for combating nematodes in the soil.

It is another object of the present invention to provide such soil treatment compositions which may be used to disinfect soil as regards certain undesired worms and the like.

It is a further object of the present invention to provide soil treatment compositions including particular active compounds together with dispersible carrier vehicles for application to the soil in accordance with versatile dosage techniques.

It is a still further object of the present invention to provide particular 2-chloro benzoxazoles as soil treatment agents in the form of compositions.

It is a still further object of the present invention to provide methods for the use of such 2-cholor benzoxazoles as disinfecting agents for the soil, whereby to combat nematodes therein.

It is a still further object of the present invention to provide particular soil treatment compositions which possess effective and versatile fungitoxic and fungicidal action on various soil fungi.

It is a still further object of the present invention to provide methods of combating soil fungi by applying to such soil containing the fungi particular 2-chloro-benzoxazoles.

Other and further objects of the present invention will become apparent from a study of the within specification and accompanying examples.

It has now been found in accordance with the present invention that 2-chloro-benzoxazoles of the general formula:

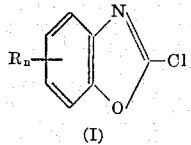

(I)

wherein

R represents a hydrogen or halogen atom, or an alkyl, haloalkyl, or alkoxy, radical containing 1–4 carbon atoms and n is an integer from 1–4, possess good nematocidal and also good soil-funigicidal properties.

It is surprising that the 2-chloro-benzoxazoles usable according to the present invention, as compared with the known 2-chloro-benzothiazoles, have a higher nematocidal activity and a better capacity for penetrating into soil and, in addition, have a good toxic activity against soil fungi. The 2-chloro-benzoxazoles are thus a valuable addition to the art, concerning those agents usable for soil treatment.

The 2-chloro-benzoxazoles usable according to the present invention are clearly characterized by the above noted general Formula I. In this formula, R preferably represents a hydrogen, chlorine or bromine atom or an alkyl radical containing 1–4 carbon atoms or a halo-alkyl radical containing 1–4 carbon atoms and 1–4 chlorine and/or bromine atoms or an alkoxy radical containing 1–4 carbon atoms. Furthermore, when $n$ is 2, -3 or 4, the radicals R may be the same or different.

Typical examples of benzoxazoles usable according to the present invention are the following: 2-chlorobenzoxazole, 2,5 - dichlorobenzoxazole, 2,5,7 - trichlorobenzenoxazole, 2,4,5-7 - tetrachlorobenzoxazole, 2-chloro-5-bromobenzoxazole, 2-chloro-5-methyl-benzoxazole, 2,5-dichloro-7-methyl-benzoxazole, 2-chloro-5-isopropyl-benzoxazole, 2-chloro-5-tert.-butylbenzoxazole, 2-chloro-5-trichloromethyl - benzoxazole, 2-chloro-5 - methoxa-benzoxazole and 2-chloro-5-trifluormethyl-benzoxazole.

Some of the 2-chloro-benzoxazoles are already known (Journal der praktischen Chemie [2] 42, 454; J.A.C.S., 21, (123). Those benzoxazoles which are new can be produced in a simple manner according to effective methods. Thus, the new benzoxazoles are obtained by reacting the corresponding 2-mercapto-benzoxazoles with chlorine or chlorine-yielding agents, especially phosphorus pentachloride, preferably in the presence of inert organic solvents, including aromatic and aliphatic hydrocarbons and chlorinated hydrocarbons, such as benzene, toluene, benzine, dichlorobenzene, methylene chloride, and carbon tetrachloride as well as ether and phosphorus oxychloride. The reaction temperatures may vary within fairly wide limits.

In general, the reaction is carried out at a temperature substantially between about 0 and 150° C. The reaction mixture is worked up in the usual manner, i.e. by distillation techniques with purification if desired using recrystallization techniques.

Advantageously, the 2-chloro-benzoxazoles usable according to the present invention have strong nematocidal and soil-funigicidal properties but a low mammalian toxicity. The instant compounds are, therefore, suitable for disinfecting cultivated soil and especially for combating phytopathogenic nematodes. Such nematodes comprise mainly leaf nematodes (Aphelenchoides), such as the chrysanthemum eelworm (A. ritzemabosi), the strawberry eelworm (A. fragariae) and the rice eelworm (A. oryzae); stalk nematodes (Ditylenchus), such as the stem eelworm (D. dipsaci); root gall nematodes (Meloidogyne), such as M. arenaria and M. incognita; cyst-forming nematodes (Heterodera), such as the potato nematode (H. rostochiensis) and the beet nematode (H. schachtii); and also free-living root nematodes, for example of the species Paratylenchus, Rotylenchus, Xiphinema and Radopholus. In addition, the instant benzoxazoles are also active against soil fungi which attack cultivated plants via the root, such as Corticium rolfsii, Sclerotinia schlerotiorum, Vertillium alboatrum, Thielaviopsis basicola, Phytophthora cactorum, Fusarium culmorum, Fusarium oxysporum and Fusarium solani f. pisi.

Because of their relatively high vapor pressure, the compounds usable according to the present invention are capable of spreading well in the soil, thus ensuring a uniform destruction of the nematodes, even if such compounds are not completely mixed with the soil. Advantageously, the instant compounds may be used with extremely good effect by simple application to the soil without the necessity for thorough admixing with the soil. The instant compounds as used in accordance with the present invention have a substantial advantage over comparable known soil disinfectants with an analogous spectrum of activity in that the present compounds have been found further to be good growth promoters for numerous cultivated plants.

The active compounds according to the instant invention can be utilized, if desired, in the form of the usual formulations or compositions with dispersible carrier vehicles, such as emulsifiable concentrates, spray powders, pastes, soluble powders, dusting agents, granulates, etc. These are prepared in known manner, for instance by extending the active agents with solvents and/or dispersible solid carriers, optionally with the use of emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles or assistants for this purpose: dispersible liquids, e.g. solvents, such as aromatic hydrocarbons (for instance benzene, toluene, xylene, etc.), chlorinated aromatic hydrocarbons (for instance chlorobenzenes), paraffins (for instance petroleum fractions) chlorinated aliphatic hydrocarbons (for instance methylene chloride, etc.), alcohols (for instance methanol, ethanol, propanol, butanol, etc.), ether-alcohols (for instance glycol monomethyl ether, etc.), amides (for instance dimethyl formamide, etc.), ketones (for instance acetone, etc.), and water; dispersible finely divided solid carriers, such as natural ground minerals (for instance kaolins, alumina, chalk, i.e., calcium carbonate, talc, etc.), and synthetic ground minerals (for instance highly dispersed silicic acid, silicates, e.g., alkali silicates, etc.); emulsifying agents, such as non-ionic and anionic emulsifying agents (for instance polyethylene oxide esters of fatty acids, polyethylene oxide ethers of fatty alcohols, alkyl sulfonates, aryl sulfonates, etc., and especially alkyl aryl-polyglycol ether, magnesium stearate, sodium oleate, etc.); and dispersing agents, such as lignin, sulfite waste liquors, methyl cellulose, etc.

The active compounds according to the instant invention may be present in such formulations or compositions in the form of mixtures with other known active agents, if desired.

In general, the compositions of formulations contain substantially between about 0.1 and 95 percent by weight of the active compound, and preferably substantially between about 0.5 and 90 percent by weight.

The substances according to the invention may be employed by themselves, in the form of their compositions with carrier vehicles or other known active agents, or in the form of particular dosage preparations for specific application made therefrom, such as solutions, emulsions, suspensions, powders and granulates which are thus ready for use.

These are applied in the usual manner, for example, by scattering or spraying on the soil, followed by working in, for example, by harrowing, grubbing or rotary hoeing. The quantities of active compound applied may vary within wide limits and depend, for example, on the degree of infestation of the soil, the weather and the season. Normally 5–250 parts by weight of active compound are used per $10^6$ parts by weight of soil. However, such compounds may be used generally in the soil in concentrations of substantially between about 1–500.

The following examples are given for the purpose of illustrating, while not limiting, the present invention:

*Example 1.—Critical concentration test*

Test nematode: root gall nematode (Meloidogyne spec.)

Solvent: 50 parts by weight glycol monomethyl ether.

To produce a suitable preparation of the active compound, 1 part by weight of active compound is mixed with the stated amount of solvent and the concentrate then diluted with water to the desired concentration.

The preparation of the active substance is intimately mixed with the soil which is heavily infested with test nematodes. The concentration of the active compound in the preparation is practically of no importance, only the concentration of active compound in the soil being decisive. Pots are filled with such soil, sown with lettuce and then kept at a greenhouse temperature of 27° C. After 4 weeks, the lettuce roots are examined for infestation with nematodes and the degree of effectiveness of the active compound is determined on a percentage basis. The degree of effectiveness is 100% when infestation is completely prevented and 0% when the infestation is exactly the same as that of the control plants in untreated soil which has been infested in the same manner.

The active compounds, the amounts applied and the results obtained can be seen from the following table:

TABLE.—CRITICAL CONCENTRATION TEST

| | Active compound | Degree of effectiveness with amounts of— | | |
|---|---|---|---|---|
| | | 40 p.p.m. | 20 p.p.m. | 10 p.p.m. |
| (II) | [benzoxazole-Cl structure] B.P., 82° C./13 mm. Hg. | 100 | 100 | 95 |
| (III) | [CH₃-benzoxazole-Cl structure] B.P., 102° C./12 mm. Hg. | 100 | 100 | 90 |
| (IV) | [CH₃-benzoxazole-Cl structure] B.P., 113° C./13 mm. Hg. | 95 | 80 | 50 |
| (V) | [benzothiazole-Cl structure] (Known from German Patent No. 1,035,959) | 80 | 50 | 0 |

In the following, the production of some 2-chlorobenzoxazoles is explained in greater detail:

*Example 2.—2-chloro-benzoxazole*

231 grams of 2-mercapto-benzoxazole are suspended in 1.5 litres of dry benzene and mixed at room temperature, while stirring and under the exclusion of moisture (by means of calcium chloride tubes), with 352 g. of phosphorus pentachloride in small portions. Stirring is continued at room temperature for 30 minutes and the mixture then slowly heated to boiling temperature. When hydrogen chloride no longer escapes from the boiling solution, the benzene is substantially completely distilled off at atmospheric pressure and the residue fractionated in a vacuum. Yield: 175 g. of 2-chloro benzoxazole; B.P. 82° C./13 mm. Hg.

*Example 3.—2,5,7-trichloro-benzoxazole*

A suspension of 104 g. of 5,7-dichloro-2-mercapto-benzoxazole in 700 cc. of dry benzene is mixed portionwise at room temperature with 109 g. of phosphorus pentachloride under the exclusion of moisture. The mixture is slowly heated to boiling temperature and boiled under reflux until the evolution of hydrogen chloride is terminated. The solvent and the phosphorus sulfochloride formed are completely distilled off, initially at atmospheric pressure and then in a vacuum. The residue is recrystallized from benzine. Yield: 50 g. of 2,5,7-trichloro-benzoxazole; M.P. 142–143° C.

In analogeous manner, the following compounds may be prepared:

(VI) 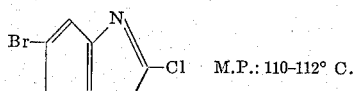 M.P.: 110–112° C.

(VII) 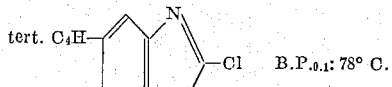 B.P.$_{0.1}$: 78° C.

(VIII) 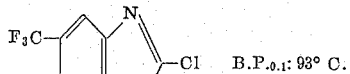 B.P.$_{0.1}$: 93° C.

(IX) 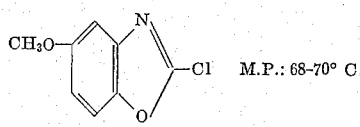 M.P.: 68–70° C.

Accordingly, the instant compounds are useful not only in combating nematodes such as those of the foregoing types but also in combating soil fungi of various kinds such as those enumerated hereinabove. The compounds usable in accordance with the present invention are usable per se, of course, in combating nematodes and soil fungi by applying to the soil, containing such nematodes and/or such fungi, nematocidal and/or fungicidal amounts of the particular compound in question. Additionally, such compounds may be applied in the form of compositions or formulations with carrier vehicles, and therefore the present invention is directed as well to such compositions or formulations per se. The application of the particular active compound of the instant type is carried out in concentrations in the soil of substantially between about 1 to 500 p.p.m. and preferably substantially between about 5 to 100 p.p.m. (wt./wt.).

More particularly, therefore, soil treatment compositions are contemplated herein which comprise a mixture of a carrier vehicle and an amount, effective for killing at least one of nematodes and soil fungi, of a 2-chloro-benzoxazole compound having the formula

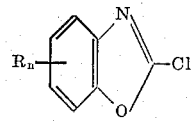

in which each R respectively represents a member selected from the group consisting of hydrogen, halogen, alkyl having 1–4 carbon atoms, haloalkyl having 1–4 halo atoms and 1–4 carbon atoms, and alkoxy having 1–4 carbon atoms, and $n$ is an integer from 1 to 4. Of course, the mixture preferably includes between about 0.1 to 95 percent by weight of the 2-chloro-benzothiazole compound and the carrier vehicle is either a dispersible finely divided solid or a dispersible liquid.

Accordingly, the present invention relates to a method of disinfecting soil which comprises applying to such soil a 2-chloro-benzothiazole compound of the foregoing type, optionally in admixture with a dispersible carrier vehicle as noted above, yet in an amount effective for killing at least one of nematodes and soil fungi.

Among the 2-chloro-benzothiazole compounds in question are those in which R in the foregoing formula is $C_1$—$C_4$ alkyl, halo, and especially chloro or bromo, $C_1$—$C_4$ halo alkyl, and especially $C_1$—$C_4$ chloroalkyl or $C_1$—$C_4$ bromoalkyl, $C_1$—$C_4$ alkoxy, and $C_1$—$C_4$ trihalo-alkyl, especially $C_1$—$C_4$ trichloroalkyl, in each instance when $n$ is 1; dihalo, especially dichloro, halo-$C_1$—$C_4$ alkyl, especially chloro-$C_1$—$C_4$ alkyl, halo-$C_1$—$C_4$ haloalkyl, especially chloro-$C_1$—$C_4$ chloroalkyl, and halo-$C_1$—$C_4$ alkoxy, especially chloro-$C_1$—$C_4$ alkoxy, in each instance when $n$ is 2; trihalo, especially trichloro, and dihalo-$C_1$—$C_4$ alkyl, especially chloro-chloro-$C_1$—$C_4$ alkyl, in each instance when $n$ is 3; tetrahalo, especially tetrachloro, in each instance when $n$ is 4; and the like.

Most especially, 2-chloro-benzothiazoles of the foregoing type are contemplated herein in which all 4 of the R substituents are hydrogen, or in which 3 of the R substituents are hydrogen, and 1 is $C_1$—$C_4$ alkyl, and preferably methyl, especially where the $C_1$—$C_4$ alkyl or methyl is in the 5-position, or in which 3 of the R substituents are hydrogen and one is halo, and preferably chloro, especially where the halo or chloro is in the 5-position.

Accordingly, R in the case where $n$ is 1 may be hydrogen;

Halo, preferably chloro or bromo;

$C_1$—$C_4$ alkyl, including especially methyl, ethyl, n-propyl, isopropyl, n-butyl, isobutyl, sec.-butyl, and tert.-butyl, and the like;

$C_1$—$C_4$ haloalkyl, preferably those $C_1$—$C_4$ alkyl substituents having 1 to 4 chloro and/or bromo substituents, such as mono-, di-, or tri- -chloro- or -bromo- -methyl; monochloro-monobromo - methyl, dichloro-monobromomethyl, or monochloro-dibromomethyl; mono-, di-, tri-, or tetra- -chloro- or -bromo- -ethyl, -n-propyl, -iso- butyl, -n-butyl, -isobutyl, -sec.-butyl, -tert.butyl; monochloro-monobromo-, dichloro-monobromo-, monochloro-dibromo-, dichloro- dibrmo-, trichloro-monobromo-, monochloro- tribromo- -ethyl, -n-propyl, -isopropyl, -n-butyl, -isobutyl, -sec.-butyl, -tert.butyl, and the like; and $C_1$—$C_4$ alkoxy, including methoxy, ethoxy, n-propoxy, isopropoxy, n-butoxy, isobutoxy, sec.-butoxy, tert.-butoxy, and the like.

Furthermore, accordingly, R in the case where $n$ is 2 to 4 may be the same or different substituents of the foregoing type, i.e. hydrogen, halo, $C_1$—$C_4$ alkyl, $C_1$—$C_4$ haloalkyl, $C_1$—$C_4$ alkoxy, and the like.

All of the various position isomers noted above are effective for the desired purpose and each exhibits a desired degree of nematocidal and fungicidal action when utilized in the soil in appropriate concentrations as well as a favorable degree of growth promoting activity on various cultivated plants or crops in the soil being treated, e.g. lettuce.

It will be appreciated that the instant specification and examples are set forth by way of illustration, and not limitation, and that various modifications and changes may be made without departing from the spirit and scope of the present invention which is to be limited only by the scope of the appended claims.

The growth promoting effect of the namatocides of the invention is shown by the following test:

Cucumbers and tomatoes are sown in pots which are filled with Fruhstorfer standard soil. The soil contains the active ingredient in a concentration of 50 p.p.m. (wt./wt.). 4 weeks after sowing, 10 of the little plants of each pot are drawn and the total weight of them is determined.

The active compound and the weight of the said 10 plants can be seen from the following table:

| Active compound | Cucumber | Tomato |
|---|---|---|
| 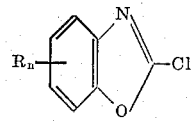C—Cl | Grams 18.2 | Grams 15.5 |
| Control | 12.5 | 10.8 |

What is claimed is:

1. Soil treatment composition which comprises a mixture of a dispersible solid carrier vehicle and an amount, effective for killing at least one of nematodes and soil fungi, of a 2-chloro-benzoxazole compound having the formula

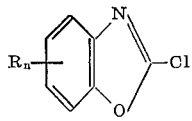

in which each R respectively represents a member selected from the group consisting of hydrogen, halogen, alkyl having 1–4 carbon atoms, haloalkyl having 1–4 halo atoms and 1–4 carbon atoms, and alkoxy having 1–4 carbon atoms, and $n$ is an integer from 1 to 4.

2. Composition according to claim 1 wherein said mixture includes substantially from about 0.1–95% by weight thereof of the 2-chloro-benzoxazole compound.

3. Soil treatment composition which comprises a mixture of a dispersible solid carrier vehicle and substantially from about 0.1–95% by weight of the mixture of a 2-chloro-benzoxazole compound having the formula

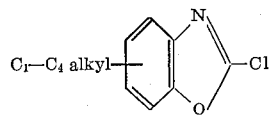

4. Soil treatment composition which comprises a mixture of a dispersible solid carrier vehicle and substantially from about 0.1–95% by weight of the mixture of a 2-chloro-benzoxazole compound having the formula

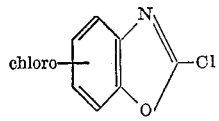

5. Soil treatment composition which comprises a mixture of a dispersible solid carrier vehicle and substantially from about 0.1–95% by weight of the mixture of a 2-chloro-benzoxazole compound having the formula

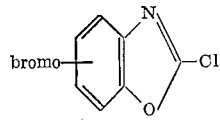

6. Soil treatment composition which comprises a mixture of a dispersible solid carrier vehicle and substantially from about 0.1–95% by weight of the mixture of a 2-chloro-benzoxazole compound having the formula

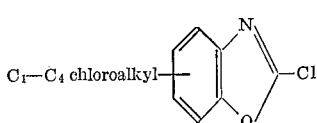

7. Soil treatment composition which comprises a mixture of a dispersible solid carrier vehicle and substantially from about 0.1–95% by weight of the mixture of a 2-chloro-benzoxazole compound having the formula

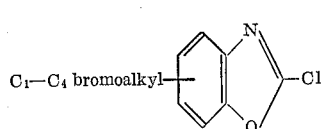

8. Soil treatment composition which comprises a mixture of a dispersible solid carrier vehicle and substantially from about 0.1–95% by weight of the mixture of a 2-chloro-benzoxazole compound having the formula

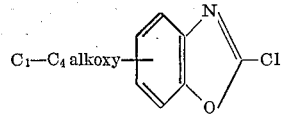

9. Soil treatment composition which comprises a mixture of a dispersible solid carrier vehicle and substantially from about 0.1–95% by weight of the mixture of a 2-chloro-benzoxazole compound having the formula

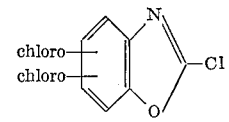

10. Soil treatment composition which comprises a mixture of a dispersible solid carrier vehicle and substantially from about 0.1–95% by weight of the mixture of a 2-chloro-benzoxazole compound having the formula

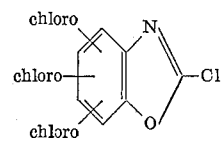

11. Soil treatment composition which comprises a mixture of a dispersible solid carrier vehicle and substantially from about 0.1–95% by weight of the mixture of a 2-chloro-benzoxazole compound having the formula

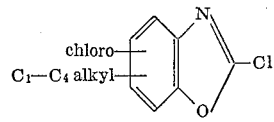

12. Soil treatment composition which comprises a mixture of a dispersible solid carrier vehicle and substantially from about 0.1–95% by weight of the mixture of a 2-chloro-benzoxazole compound having the formula

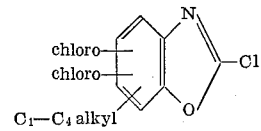

13. Soil treatment composition which comprises a mixture of a dispersible solid carrier vehicle and substantially from about 0.1–95% by weight of the mixture of a 2-chloro-benzoxazole compound having the formula

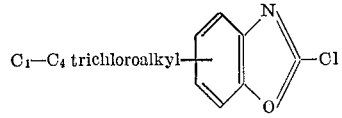

14. Soil treatment composition which comprises a mixture of a dispersible solid carrier vehicle and substantially from about 0.1–95% by weight of the mixture of a 2-chloro-benzoxazole compound having the formula

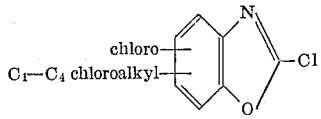

15. Soil treatment composition which comprises a mixture of a dispersible solid carrier vehicle and substantially from about 0.1–95% by weight of the mixture of a 2-chloro-benzoxazole compound having the formula

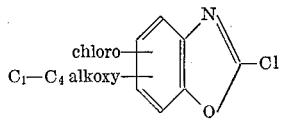

16. Soil treatment composition which comprises a mixture of a dispersible solid carrier vehicle and substantially from about 0.1–95% by weight of the mixture of a 2-chlorobenzoxazole having the formula

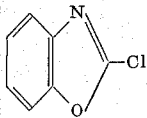

17. Soil treatment composition which comprises a mixture of a dispersible solid carrier vehicle and substantially from about 0.1–95% by weight of the mixture of a 2,5-dichlorobenzoxazole having the formula

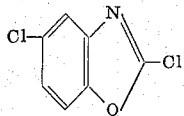

18. Soil treatment composition which comprises a mixture of a dispersible solid carrier vehicle and substantially from about 0.1–95% by weight of the mixture of a 2,5,7-trichlorobenzoxazole having the formula

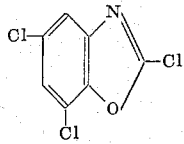

19. Soil treatment composition which comprises a mixture of a dispersible solid carrier vehicle and substantially from about 0.1–95% by weight of the mixture of 2-chloro-5-methyl-benzoxazole having the formula

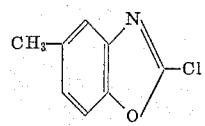

20. Soil treatment composition which comprises a mixture of a dispersible solid carrier vehicle and substantially from about 0.1–95% by weight of the mixture of 2,4,5,7-tetrachlorobenzoxazole having the formula

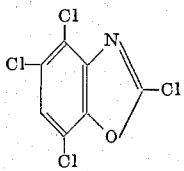

21. Soil treatment composition which comprises a mixture of a dispersible solid carrier vehicle and substantially from about 0.1–95% by weight of the mixture of 2-chloro-5-bromo-benzoxazole having the formula

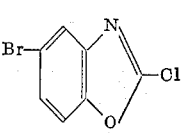

22. Soil treatment composition which comprises a mixture of a dispersible solid carrier vehicle and substantially from about 0.1–95% by weight of the mixture of 2,5-dichloro-7-methyl-benzoxazole having the formula

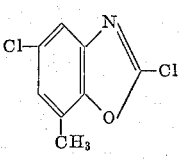

23. Soil treatment composition which comprises a mixture of a dispersible solid carrier vehicle and substantially from about 0.1–95% by weight of the mixture of 2-chloro-5-isopropyl-benzoxazole having the formula

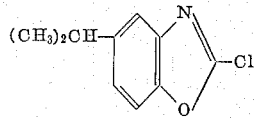

24. Soil treatment composition which comprises a mixture of a dispersible solid carrier vehicle and substantially from about 0.1–95% by weight of the mixture of 2-chloro-5-tert-butyl-benzoxazole having the formula

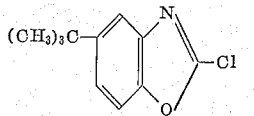

25. Soil treatment composition which comprises a mixture of a dispersible solid carrier vehicle and substantially from about 0.1–95% by weight of the mixture of 2-chloro-5-trifluoromethyl-benzoxazole having the formula

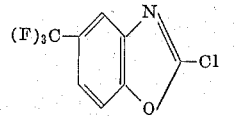

26. Soil treatment composition which comprises a mixture of a dispersible solid carrier vehicle and substantially from about 0.1–95% by weight of the mixture of a 2-chloro-5-methoxy-benzoxazole having the formula

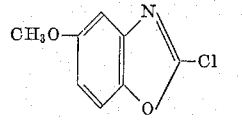

27. Method of disinfecting soil to combat at least one of (a) nematodes and (b) soil fungi which comprises applying to such soil a 2-chloro-benzoxazole compound having the formula

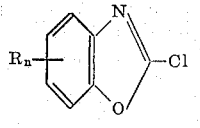

in which each R respectively represents a member selected from the group consisting of hydrogen, halogen, alkyl having 1–4 carbon atoms, haloalkyl having 1–4 halo atoms and 1–4 carbon atoms, and alkoxy having 1–4 carbon atoms, and $n$ is an integer from 1 to 4.

28. Method according to claim 27 wherein said compound is used in admixture with a dispersible carrier vehicle, said compound being present in an amount substantially between about 0.1–95% by weight of the mixture and effective for killing at least one of nematodes and soil fungi.

29. Method of combating nematodes in the soil which comprises applying to such nematodes and their soil habitat a nematocidal amount of a 2-chloro-benzoxazole compound having the formula

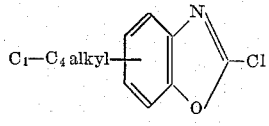

30. Method of combating nematodes in the soil which comprises applying to such nematodes and their soil habitat a nematocidal amount of a 2-chloro-benzoxazole compound having the formula

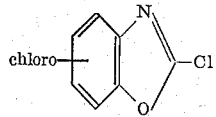

31. Method of combating nematodes in the soil which comprises applying to such nematodes and their soil habitat a nematocidal amount of a 2-chloro-benzoxazole compound having the formula

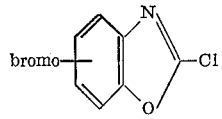

32. Method of combating nematodes in the soil which comprises applying to such nematodes and their soil habitat a nematocidal amount of a 2-chloro-benzoxazole compound having the formula

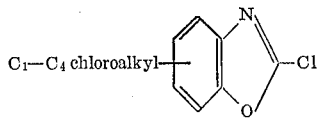

33. Method of combating nematodes in the soil which comprises applying to such nematodes and their soil habitat a nematocidal amount of a 2-chloro-benzoxazole compound having the formula

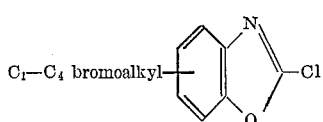

34. Method of combating nematodes in the soil which comprises applying to such nematodes and their soil habitat a nematocidal amount of a 2-chloro-benzoxazole compound having the formula

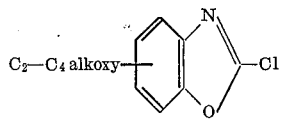

35. Method of combating nematodes in the soil which comprises applying to such nematodes and their soil habitat a nematocidal amount of a 2-chloro-benzoxazole compound having the formula

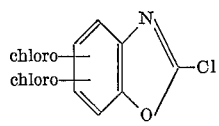

36. Method of combating nematodes in the soil which comprises applying to such nematodes and their soil habitat a nematocidal amount of a 2-chloro-benzoxazole compound having the formula

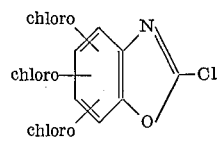

37. Method of combating nematodes in the soil which comprises applying to such nematodes and their soil habitat a nematocidal amount of a 2-chloro-benzoxazole compound having the formula

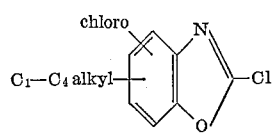

38. Method of combating nematodes in the soil which comprises applying to such nematodes and their soil habitat a nematocidal amount of a 2-chloro-benzoxazole compound having the formula

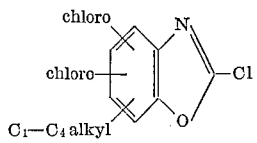

39. Method of combating nematodes in the soil which comprises applying to such nematodes and their soil habitat a nematocidal amount of a 2-chloro-benzoxazole compound having the formula

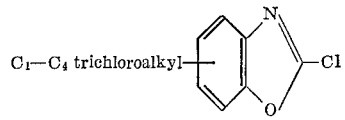

40. Method of combating nematodes in the soil which comprises applying to such nematodes and their soil habitat a nematocidal amount of a 2-chloro-benzoxazole compound having the formula

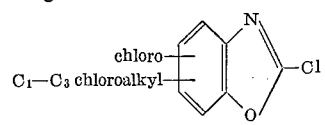

41. Method of combating nematodes in the soil which comprises applying to such nematodes and their soil habitat a nematocidal amount of a 2-chloro-benzoxazole compound having the formula

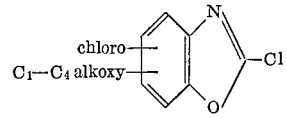

42. Method of combating nematodes in the soil which comprises applying to such nematodes and their soil habitat a nematocidal amount of a 2-chloro-benzoxazole compound having the formula

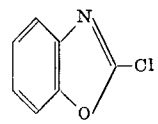

43. Method of combating nematodes in the soil which comprises applying to such nematodes and their soil habitat a nematocidal amount of a 2-chloro-benzoxazole compound having the formula

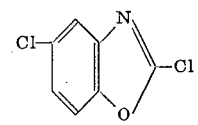

44. Method of combating nematodes in the soil which comprises applying to such nematodes and their soil habitat a nematocidal amount of a 2-chloro-benzoxazole compound having the formula

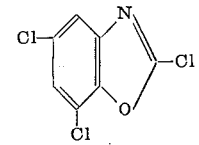

45. Method of combating nematodes in the soil which comprises applying to such nematodes and their soil habitat a nematocidal amount of a 2-chloro-benzoxazole compound having the formula

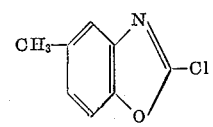

46. Method of combating nematodes and soil fungi in the soil which comprises applying in a concentration of substantially between about 1–500 parts per million parts of soil to such nematodes and fungi in the soil a nematocidal and fungicidal amount of a 2-chloro-benzoxazole compound having the formula

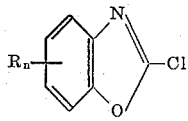

in which each R respectively represents a member selected from the group consisting of hydrogen, halogen, alkyl having 1–4 carbon atoms, haloalkyl having 1–4 halo atoms and 1–4 carbon atoms, and alkoxy having 1–4 carbon atoms, and $n$ is an integer from 1 to 4.

47. Method of combating nematodes in the soil which comprises applying to such nematodes and their soil habitat a nematocidal amount of a 2-chloro-benzoxazole compound having the formula

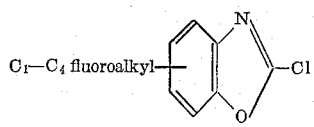

References Cited by the Examiner

UNITED STATES PATENTS

| | | | |
|---|---|---|---|
| 2,429,178 | 10/1947 | Anish | 260—307.4 |
| 2,969,370 | 1/1961 | Britton et al. | 260—307.4 |

FOREIGN PATENTS 613,172  5/1935  Germany.

JULIAN S. LEVITT, *Primary Examiner.*

S. J. FRIEDMAN, *Assistant Examiner.*

UNITED STATES PATENT OFFICE
CERTIFICATE OF CORRECTION

Patent No. 3,284,294                            November 8, 1966

Klaus Sasse et al.

It is hereby certified that error appears in the above numbered patent requiring correction and that the said Letters Patent should read as corrected below.

Column 1, line 15, for "the" read -- that --; line 35, for "2-cholor" read -- 2-chloro- --; column 4, the Table, second column, third formula left-hand side for "CH3" read -- Cl --; column 5, line 14, in formula of compound VII, left-hand side for "tert. $C_4H$" read -- tert. $C_4H_9$ --; column 6, line 32, for "dichloro-dibrmo-" read -- dichloro-dibromo- --; line 49, beginning with "It will be" strike out all to and including "appended claims." in line 54, same column 6, and insert the same after the table at the bottom of column 6; column 8, line 55, the right-hand side of the formula should appear as shown below instead of as in the patent:

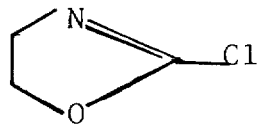

column 10, line 29, after "mixture of" strike out "a".

Signed and sealed this 19th day of September 1967.

(SEAL)
Attest:

ERNEST W. SWIDER                          EDWARD J. BRENNER
Attesting Officer                         Commissioner of Patents